United States Patent [19]
Blackwell et al.

[11] Patent Number: 5,804,113
[45] Date of Patent: Sep. 8, 1998

[54] METHOD AND DEVICE FOR THE CONTINUOUS MANUFACTURE OF SLABSTOCK POLYURETHANE FOAM WITHIN A PREDETERMINED PRESSURE RANGE

[75] Inventors: Brian James Blackwell, Cheshire, United Kingdom; Lucien Jourquin, Wetteren, Belgium; Johannes A. M. G. Derksen, Nijmegen, Netherlands; Rudi Mortelmans, Temse, Belgium

[73] Assignee: Prefoam AG, Basel, Switzerland

[21] Appl. No.: 715,488

[22] Filed: Sep. 18, 1996

Related U.S. Application Data

[63] Continuation of Ser. No. 232,154, Nov. 30, 1994, abandoned.

[51] Int. Cl.[6] .................................................. B29C 44/28
[52] U.S. Cl. ........................... 264/51; 264/45.8; 264/101; 425/4 C; 425/73; 425/143
[58] Field of Search .............................. 264/52, 500, 555, 264/40.3, 51, 45.8, 101; 425/4 C, 817 C, 73, 143

[56] References Cited

U.S. PATENT DOCUMENTS

| | | | |
|---|---|---|---|
| 4,120,923 | 10/1978 | Kloker et al. | 264/45.8 |
| 4,146,563 | 3/1979 | Ratafia et al. | 264/555 |
| 4,278,624 | 7/1981 | Kornylak | 425/4 C |
| 4,486,369 | 12/1984 | Schafler et al. | |
| 4,487,731 | 12/1984 | Kobayashi | |
| 4,530,807 | 7/1985 | Vreenegoor | 264/51 |
| 4,601,864 | 7/1986 | Vreenegoor | 264/37 |
| 4,777,186 | 10/1988 | Stang et al. | 521/50 |
| 5,375,988 | 12/1994 | Klahre | 425/817 C |

FOREIGN PATENT DOCUMENTS

| | | | |
|---|---|---|---|
| 0 044 226 | 1/1982 | European Pat. Off. | |
| 0 127 385 | 12/1984 | European Pat. Off. | |
| 63-172625 | 7/1988 | Japan | 264/52 |
| 2 050 922 | 1/1981 | United Kingdom. | |
| WO9105648 | 5/1991 | WIPO | 425/4 C |

*Primary Examiner*—Allan R. Kuhns
*Attorney, Agent, or Firm*—Finnegan, Henderson, Farabow, Garrett & Dunner, L.L.P.

[57] ABSTRACT

A method and device for continuously producing slabstock polyurethane foam wherein a polymerizable reaction mixture containing a blowing agent is applied onto a moving conveyor and allowed a free rise expansion and polymerization within a substantially closed space. The pressure in this space is maintained within a predetermined pressure range by continuously supplying gas to the space, in addition to the blowing gas produced by the reaction and by simultaneously exhausting gas from said space. In this way, pressure fluctuations are reduced in the space and further parameters such as the temperature can be controlled so as to enable production of a foam with constant properties.

27 Claims, 2 Drawing Sheets

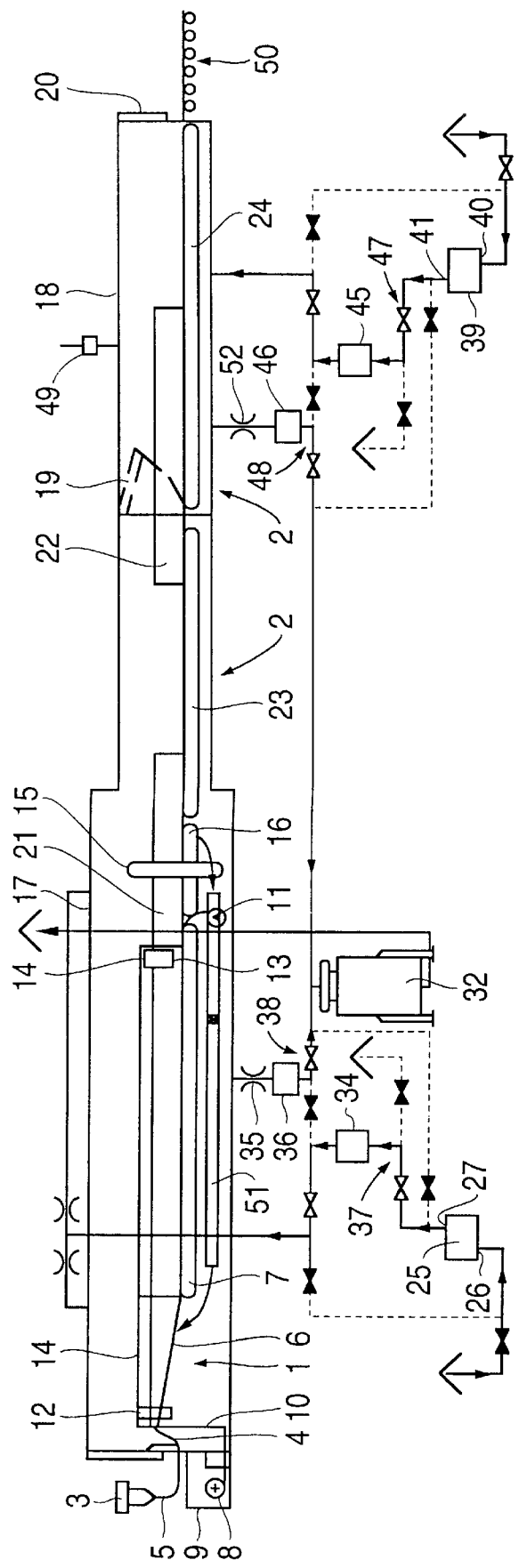

METHOD AND DEVICE FOR THE CONTINUOUS MANUFACTURE OF SLABSTOCK POLYURETHANE FOAM WITHIN A PREDETERMINED PRESSURE RANGE

This application is a continuation of application Ser. No. 08/232,154, filed Nov. 30, 1994, now abandoned.

The present invention relates to a method for the continuous manufacture of slabstock polyurethane foam comprising preparing a polymerizable reaction mixture containing a blowing agent, applying said reaction mixture substantially continuously onto moving conveyor means and allowing a free rise expansion and polymerization of this reaction mixture so as to form said foam, which free rise expansion and polymerization of the reaction mixture is performed in a substantially hermetically closed space wherein the reaction mixture is at least partially surrounded by a layer of gas, the pressure of which gas is maintained during said free rise expansion and polymerization within a predetermined pressure range, at least partially by exhausting gas from said space.

Such a method is disclosed in EP-A1-0 044 226. In this known method, the foam process is performed under controlled conditions of pressure. According to this method the foam process can be performed for example at a reduced pressure so that a smaller amount of physical and chemical blowing agents, especially water, is required to obtain a desired low density. Due to the smaller amount of water, the produced polyurethane foam will be softer. In contrast, the hardness of the polyurethane foam can be increased by performing the foam process under a higher pressure while using a higher amount of blowing agents such as water. In this way, it is therefore possible to use the pressure as an additional formulation parameter.

A well known problem in the continuous manufacture of slabstock polyurethane foam consists in that the surrounding air pressure should be maintained always at a same constant value in order to manufacture a foam with constant properties. Indeed, it is well known that even relatively small pressure fluctuations have for example an influence on the density and the hardness of the produced foam. In this respect, it has been observed that when use is made of the present continuously operating polyurethane slabstock foam producing machines, which are all of the open type, i.e. wherein the foam process is performed under ambient conditions of pressure, day to day changes in surrounding atmospheric pressure cause variations of density and of other properties such as the hardness of the slabstock foam. Moreover, it will be clear that when using a hermetically enclosed continuous foam producing machine without appropriate controls, the pressure variations within said enclosure may even be much larger and quicker than the day to day variations of ambient pressure.

EP-A1-0 044 226 teaches means for controlling the pressure mainly in an enclosed discontinuous foam producing machine. The possibility of using these means in a continuous foam producing machine is only mentioned in one single paragraph. However, these continuous foam producing machines have very much larger dimensions than discontinuous foam producing machines and require for example an enclosure of 1000 to 1500 m³.

In order to maintain a substantially constant high pressure, EP-A1-0 044 226 proposes to use a relief valve which allows release of gas when the pressure exceeds a predetermined constant value. Additionally, a compression pump may be used which is operated in conjunction with a pressure gauge, relief valve and switching controls. Although EP-A1 0 044 226 does not mention anything about how to operate these pressure control means, it would be obvious to use the switching controls for switching the compression pump on and off according to the pressure measured by the pressure gauge. Moreover, according to the teachings of U.S. Pat. No. 4,777,186 a person skilled in the art would use the compression pump only to obtain said high pressure, preferably before the foam process is started. After having produced the desired pressure, he would switch off the compression pump and maintain a substantially constant super-atmospheric pressure by venting the enclosed foam producing machine during the reaction.

A drawback of the hereabove described method is that it does not allow to maintain a sufficiently constant high pressure in a large continuous foam producing machine which is required to obtain slabstock polyurethane foam of uniform properties. Indeed a minimum pressure fluctuation is always required in the known foam producing machine either to activate the switching controls for switching the compression pump on or off, and/or to open or close the relief valve.

EP-A1-0 044 226 discloses further the use of a vacuum pump and appropriate controls, which are not described further, to maintain a substantially constant reduced pressure. In this respect, the present inventors have carried out experiments with a large hermetically enclosed continuous foam producing machine wherein they tried to maintain a constant low pressure by controlling the speed of the used pump units so as to pump gases out of the enclosure at a flow rate substantially equal to the blowing gas production rate but it appeared that it is not possible in this way to maintain said pressure sufficiently constant.

An object of the present invention is therefore to provide a method for the continuous manufacture of slabstock polyurethane foam wherein pressure fluctuation around the reaction mixture are reduced during the foam process in order to enable the continuous manufacture of slabstock polyurethane foam of a substantially constant quality.

To this end, a method according to the invention is characterized in that gas is substantially continuously supplied to said space, in addition to the blowing gas production, during said free rise expansion and polymerization while gas is simultaneously exhausted from said space so as to maintain said pressure within said pressure range and so as to reduce fluctuations of said pressure within said pressure range. Surprisingly, it has been found experimentally that by continuously supplying a gas into the enclosed space around the reacting reaction mixture while simultaneously exhausting gas from said space, the pressure fluctuation in said space are reduced with respect to the pressure fluctuations occuring in the event that no additional gas is supplied and that therefore only the gases evolving from the reaction mixture are exhausted.

In a preferred embodiment of the method according to the invention, the temperature of the gas layer in said closed space is maintained, at least during said free rise expansion and polymerization, within a range of 3% at the most below or above a predetermined temperature value at least partially by controlling the temperature and/or the flow rate of the gas supplied to said space. In this way, the method according to the invention also allows to control the temperature around the reaction mixture, which temperature has also an influence on the properties of the produced foam.

In a particular embodiment of the method according to the invention, the pressure within said space is maintained at or below the prevailing ambient pressure and said gas is supplied at a flow rate which is at least equal to half the rate of blowing gas production and which is preferably at least equal to said blowing gas production rate but which flow rate is smaller than five times said blowing gas production rate and preferably smaller than three times said blowing gas production rate.

In another particular embodiment of the method according to the invention, the pressure within said space is maintained above the prevailing ambient pressure and said gas is supplied at a flow rate which is at least equal to one tenth of the rate of gas production and which is preferably at least equal to one third of the blowing gas production rate but which flow rate is smaller than four times said blowing gas production rate and preferably smaller than twice said blowing gas production rate.

Within the flow rate limits defined in these two particular embodiments, the pressure as well as the temperature can be controlled sufficiently accurately without producing too much waste gases which are preferably to be purified.

In the method according to the invention, gas can be supplied either actively or passively, at the prevailing ambient pressure into said space while gas can be exhausted also either actively or passively, depending on the pressure created in said space. For a substantially constant pressure at or near the prevailing atmospheric pressure, gas will be supplied and exhausted actively.

The invention further also relates to a device for the continuous manufacture of slabstock polyurethane foam comprising a substantially hermetical enclosure, conveyor means inside said enclosure, a mixing head for mixing polyurethane reaction components containing a blowing agent, means for discharging said reaction mixture onto said conveyor means while they are continuously moving so as to enable a free rise expansion and polymerization of said reaction mixture along said conveyor means, gas pumping means having a gas inlet and a gas outlet, and means for connecting said gas inlet to said enclosure so as to enable to actively exhaust gas from said enclosure by means of said gas pumping means during said free rise expansion and polymerization.

Such a device is disclosed in EP-A1-0 044 226. In this known device, the means for actively exhausting gas are comprised of a vacuum pump. As already explained hereinabove, it appeared to be not feasible to maintain a sufficiently constant low pressure within the enclosure of a large continuous foam producing machine only by controlling the vacuum pump.

In order to obviate this and other drawbacks, the device according to the invention is characterized in that it is provided with means for continuously supplying gas into said enclosure during said free rise expansion and polymerization while simultaneously actively exhausting gas from said enclosure by means of said gas pumping means so as to reduce pressure fluctuations within said enclosure.

BRIEF DESCRIPTION OF THE DRAWINGS

Other details and advantages of the method and the device according to the invention will become apparent from the following description of some particular embodiments; this description is only given by way of illustrative example and is not intended to limit the scope of the invention. The reference numerals relate to the annexed drawings wherein:

FIG. 2 is also a schematical sectional view of the device according to FIG. 1 wherein an above ambient pressure is created.

DETAILED DESCRIPTION OF THE INVENTION

Figure 1:
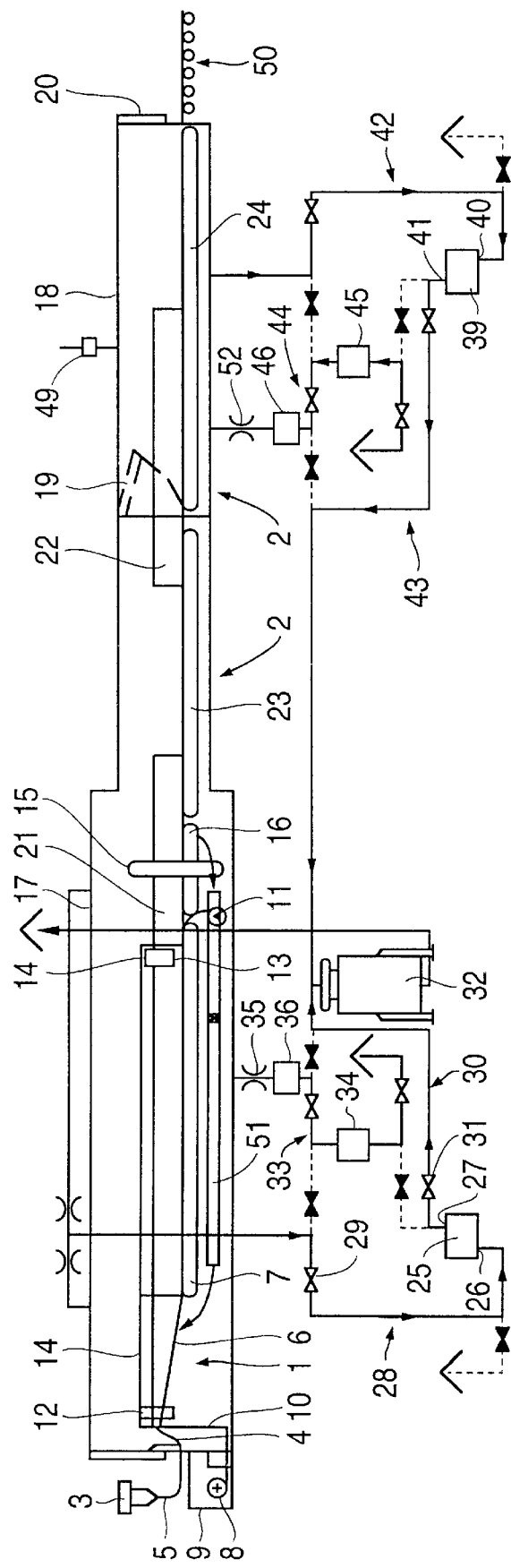
FIG. 1 is a schematical sectional view of a device according to the invention wherein a below ambient pressure is created.

In the method according to the invention, even as in the conventional, open continuous polyurethane slabstock foam producing machines, a polymerizable reaction mixture containing a blowing agent is prepared, said reaction mixture is applied continuously onto moving conveyor means, including usually at least one moving paper or film and one or more conveyor belts, and this reaction mixture is allowed to rise freely and to polymerize so as to form said foam. This foam process can be performed by means of a known continuous foam producing machine of the "inclined conveyor" type, the "Maxfoam/Varimax" type, or the "Quadro-Foamat" type, all three with or without flat top system, or of the "Vertifoam" type. The reaction mixture is usually prepared from a polyol and a polyisocyanate component.

The polyol component may comprise for example polyether polyols which are prepared by reacting one or more alkylene oxides or substituted alkylene oxides, such as ethylene oxide or propylene oxide, with one or more active hydrogen containing initiators, such as glycerol or trimethylol propane, partially or completely aminated polyether polyols of the type described above, polyester polyols which are prepared by reacting, for example, one or more polycarboxylic acids or anhydrides or esters thereof, such as adipic acid, phtalic acid, . . . , with one or more polyhydric alcohols, such as ethylene glycol, glycerol, . . .

polyether or polyester polyols which contain polyaddition or polycondensation polymers in dispersed or soluble state.

The polyisocyanate component can consist of various aliphatic or aromatic isocyanates of which TDI, MDI, prepolymers of TDI or MDI and all possible mixtures thereof are most commonly used.

As blowing agents chemical blowing agents, such as water, formic acid or derivatives thereof, and physical blowing agents, such as CFC 11, methylene chloride and other CFC's, HCFC's and liquids with relatively low boiling point can be used.

The reaction mixture comprises also catalysts, such as well known amine catalysts and/or metal catalysts. Surfactants are also generally necessary and numerous types have been found satisfactory. If necessary other additives such as flame retardants, crosslinkers, extenders, fillers, cellopeners, pigments, antioxidants, . . . may be added to the reaction mixture.

In the method according to the invention, the free rise expansion and polymerization is performed in a substantially hermetically closed or gas-tight space wherein the reaction mixture is at least partially surrounded by a layer of gas. In a first phase, i.e. when the free rise expansion starts, and preferably already before the expansion of the reaction mixture starts, the pressure of the gases is adjusted within a predetermined pressure range. This pressure range is normally comprised between 0.5 and 10 bars and usually between 0.7 and 1.5 bar. In a second phase, i.e. during the continuous manufacture of polyurethane foam, the pressure is maintained within said predetermined pressure range, on the one hand, by exhausting gas from said space and, on the other hand, by continuously supplying gas to said space, in addition to the blowing gas production during said free rise expansion and polymerization of the reaction mixture. It has been found surprisingly that due to the combination of exhausting gas from and supplying at the same time, in addition to the blowing gas production, continuously gas to said space, the pressure fluctuations in said space can be considerably reduced.

When the desired pressure in said space is sufficiently lower than the prevailing ambient pressure, gas can be supplies at that prevailing ambient pressure through an inlet into said space. The supply of gas into said space is then controlled for example by means of adjustable inlet valves or possibly by using orifice plates of different diameters.

Instead of passively supplying gas into said space, this gas can also be supplied actively, under pressure, into said space, for example when the pressure within said space is to be maintained at a value near or above the prevailing atmospheric pressure. Preferably air is added to said space but also other gases such as carbon dioxide, nitrogen gas or mixtures of these gases can be used.

Due to the supply of gas into said closed space, either actively or passively, not only the pressure but also the temperature of the gases in said space can be controlled. To this end the temperature of the gas supplied to said space is controlled and the flow rate of this gas can possibly also be adjusted. Moreover, it is also possible to recirculate a cooling or heating fluid medium along or through said space. Preferably, the temperature of the gases in said space is maintained in this way, at least during said second phase, within a range of 5% at the most below or above a predetermined temperature value. This temperature value is normally comprised between 10° and 75° C. and usually between 20° and 50° C.

In the method according to the invention the opacity of the gases within the space around the reaction mixture is also controlled by ventilating said space, notably by exhausting gas from said space while simultaneously supplying gas into the latter as described hereinabove. In this way vapors such as for example volatilized isocyanates are removed from said space which is an important feature since said vapors may be deposited otherwise onto camera's, sensors, photocells, view windows, etc. . . . necessary for controlling the automatic functioning of the foam producing machine.

The method according to the invention allows a substantially complete control of the different conditions around the foaming reaction mixture including the pressure, temperature, opacity and preferably also for example the humidity of the gases surrounding the reaction mixture.

In a first particular embodiment of the method according to the invention, the pressure within said space is maintained at or below the prevailing ambient pressure, i.e. the pressure around the enclosed continuous foam producing machine, whereas, in a second particular embodiment, said pressure is maintained above the prevailing ambient pressure. In order to reduce pressure fluctuations and also to enable to control the temperature within said space, gas is supplied to the latter either actively or passively, in the first particular embodiment at a flow rate which is at least equal to half the blowing gas production rate and which is preferably at least equal to said gas production rate, and, in the second particular embodiment, at a flow rate which is at least equal to one tenth of the blowing gas production rate and which is preferably at least equal to one third of said gas production rate. In the first particular embodiment, gas is supplied at a flow rate smaller than five times the blowing gas production rate and preferably smaller than three times said gas production rate and in the second particular embodiment, gas is supplied at a flow rate smaller than four times the blowing gas production rate and preferably smaller than twice said gas production rate, so as to effectively control the pressure and so as to avoid large volumes of exhausted gases. The gases are preferably purified before they are released to the atmosphere, or they can be reintroduced into said space. For an economically feasible continuous foam producing machine producing for example about 1000 m³ foam per hour, the flow rate of the gas supply is comprised between 100 and 5000 Nm³/per hour (normal m³, i.e. the number of m³ gas when the gas is at normal atmospheric pressure).

In the method according to the invention, gas may be supplied at a substantially constant flow rate. By selecting the appropriate flow rate, the pressure can be maintained, in said second phase, within a range of 1% below or above a predetermined pressure value. The remaining pressure fluctuations are therefore smaller than the day to day variations in ambient pressure so that a foam with more constant properties can be manufactured by the method according to the invention with respect to foams manufactured with the conventional open slabstock foam producing machines. If necessary, the supply of gas may also be controlled so as to further reduce the pressure fluctuations within said space.

Further advantages of the method according to the invention are that a much smaller amount of gases has to be purified compared to the amount of gases removed by the exhaust hood above the conventional continuous foam producing machines, that the exhausted gases contain a higher amount of noxious substances so that the purifying unit can function more efficiently and that a smaller amount of blowing agents is required. Notwithstanding all these advantages, a hermetically enclosed continuous foam machine has never been used in practice since it was not possible to control the inside conditions of pressure and temperature conveniently. Indeed, without an appropriate control of the pressure, the variations of the foam properties will be much larger compared to foams produced under atmospheric conditions of pressure.

The annexed figures show a schematical sectional view of a suitable device for the continuous manufacture of polyurethane foam according to the invention. This device comprises a continuous foam producing machine 1 enclosed in a hermetical enclosure 2. The used continuous foam producing machine 1 is known per se and can be of the "Maxfoam/Varimax" type, as illustrated in the figures, the "inclined conveyor" type or the "Vertifoam" type or the "Quadro-Foamat" type. The illustrated foam machine 1 comprises a mixing head 3 for mixing polyurethane reaction components containing a blowing agent, a trough 4 connected by means of a duct 5 to an outlet of the mixing head 3, a so-called fall-plate section 6 and a first conveyor belt 7. A bottom paper or film feed unit 8 is provided either inside enclosure 2 or in a separate enclosure 9 as in the illustrated device. The bottom paper or film 10 delivered by said bottom paper feed unit 8 runs over the fall-plate section 6 and over the first conveyor belt 7 and is rewinded on a bottom paper rewind unit 11. There are also two side paper/film feed units 12, one on each side of the machine and two side paper/film rewind units 13 mounted in such a manner that the delivered side paper or film is running between the side walls 14. A top paper /film feed unit and a corresponding rewind unit may also be provided.

The illustrated device further comprises a foam block cut off unit 15 mounted above a further conveyor belt 16 located after the first conveyor belt 7 inside enclosure 2.

The enclosure 2 of the device according to the invention is preferably divided into at least two compartments 17 and 18 by means of a hermetical partition door 19, the first compartment 17 of which is the so-called process enclosure 17 containing the continuous foam producing machine 1 whereas the second compartment 18 is an airlock enclosure 18. This airlock enclosure is provided with an outlet door 20 for the produced foam blocks.

In the device according to the invention, the reaction mixture prepared in the mixing head 3 is discharged onto moving conveyor means composed of the bottom paper 10 moving continuously over the fall-plate section 6 and the first conveyor belt 7 so as to enable a free rise expansion and polymerization of said reaction mixture. The slabstock polyurethane foam 21 produced in this way is then cut off by the cut off unit 15 into blocks 22 of a desired length. The cut off unit 15 is located at such a distance from the trough 4 that the produced foam 21 has polymerized sufficiently when reaching the cut off unit 15 so as to prevent damaging the foam during the cutting off, the minimum required polymerization time comprises usually about 6 minutes. The distance between the cut off unit 15 and the airlock enclosure 18 depends on the desired block length and comprises for example about 30 meters. It is clear that the length of the airlock enclosure 18 depends on the desired block length and may therefore comprise also for example 30 meters. In order to transport the cut off foam blocks 22 from the process enclosure 17 into the airlock enclosure 18, the process enclosure 17 comprises a second conveyor belt 23 and the airlock enclosure a third conveyor belt 24 which are provided to accelerate the cut off foam blocks 22 into the airlock enclosure 18. It is clear that the large dimensions of the required enclosure and the continuous production of polyurethane foam make it difficult to maintain a constant pressure within the enclosure.

As it will be described hereinafter, the invention provides means for reducing the pressure fluctuations in the enclosure as well when the pressure within the enclosure is to be maintained below, above or near the prevailing ambient pressure. These means are essentially composed of pumping units and suitable pipings provided with valves. FIG. 1 shows in full lines those pipes which are in operation when creating a below ambient pressure and in dashed lines the pipes which are shut-off by closed valves represented by a completely black valve symbol ▶◀ while the open valves are indicated by an open valve symbol ▷◁. FIG. 2 represents the situation wherein an above ambient pressure is created in the enclosure.

The device according to the invention comprises gas pumping means 25, preferably a blower unit 25, provided with a gas inlet 26 and a gas outlet 27, and a piping 28 for connecting the gas inlet 26 to the process enclosure 17 so as to enable, when valve 29 is open, as shown in FIG. 1, to actively exhaust gas from said process enclosure 17. The exhausted gases are led through a piping 30, with valve 31 in the open position, to a fume scrubbing device, for example an activated carbon absorption unit 32, so as to purify these gases before exhausting them into the free atmosphere.

An important feature of the device according to the invention is that it comprises means 33 for continuously supplying gas into the process enclosure 17 while gas is simultaneously exhausted from the latter by means of said blower unit 25. The gas supplying means 33 of the illustrated device comprise a piping for supplying ambient air, a heat exchanger 34 for controlling the temperature of the supplied air and an adjustable valve 33 allowing to control the flow rate of the supplied gas, in particular air.

As explained hereinabove, the combination of exhausting gas and supplying gas allows surprisingly to reduce pressure fluctuations in said enclosure or, in other words, to maintain a more constant pressure within the enclosure. This pressure may be well below the prevailing ambient pressure but, when said gas supplying means 33 comprise for example an auxiliary pump unit 36 to ensure a sufficient gas supply into the enclosure, also near or somewhat above the prevailing ambient pressure.

In the illustrated device according to the invention and as shown in FIG. 2, the gas outlet 27 of blower unit 25 may also be connected through pipings 37 over the heat exchanger 34 to the process enclosure 17 while the gas inlet 26 is in fluid communication with the free atmosphere or a gas container. In order to maintain a constant above ambient gas pressure in the process enclosure 17, gases are removed through a piping 38 over the adjustable valve 35 and the auxiliary pump unit 36 to the fume scrubbing device 32. This auxiliary pump unit 36 is preferably a two-way pump or blower unit which allows to pump gas either in or out the process enclosure 17. In contrast, the blower unit 25 rotates always in the same direction and can create either an over-pressure or an underpressure in the process enclosure 17 by setting the different valves in the appropriate positions. An analogous mechanism can, however, also be used for the auxiliary pump unit 36.

The airlock enclosure 18 of the device according to the invention is provided to evacuate the cut off foam blocks 22 from the process enclosure without causing pressure fluctuations in the latter. To this end, said device further comprises means for adjusting the pressure within said airlock enclosure 18 to the pressure within the process enclosure 17 when said outlet door 20 and said partition door 19 are closed, before opening said partition door 19. These means are preferably also provided for maintaining the pressure in the airlock enclosure 18 substantially constant at least when said partition door 19 is open. They comprise in the illustrated device, in an analogous way as for the process enclosure 17, a blower unit 39 and suitable pipings to connect either its gas inlet 40 or its gas outlet 41 to the airlock enclosure 18.

In the situation represented in FIG. 1, for creating a below ambient pressure, the inlet 40 of blower unit 39 is connected through a piping 42 to the airlock enclosure 18 to reduce the pressure therein while its outlet 41 is connected through a piping 43 to the fume scrubbing unit 32. In order to reduce pressure fluctuations in the airlock enclosure 18, especially when the partition door 19 is open, as represented in the Figures, and also in order to enable to adjust the temperature in the airlock enclosure 18 to the temperature in the process enclosure 17, a piping 44 including a heat exchanger 45 is provided for supplying air into the airlock enclosure 18. This piping 44 can further comprise an adjustable valve 52 and possibly also an auxiliary pump unit 46, preferably a two-way pump unit, to control the flow rate through this piping 44, especially when the pressure within said airlock enclosure has to be adjusted to a value near the ambient pressure.

In order to realize an above ambient pressure in airlock enclosure 18 as in FIG. 2, the outlet 41 of the blower unit 39 is connected through a piping 47, including said heat exchanger 45 for adjusting the temperature in the airlock enclosure, to the airlock enclosure 18 while the inlet 40 of blower unit 39 is in fluid communication with the free atmosphere or a gas container. In this situation, gas is removed from the air-lock enclosure 18 over adjustable valve 52 and two-way pump unit 46, through a piping 48 to the fume scrubbing unit 32. This valve 45 and/or the two-way pump unit 46 allow to control the flow rate of the gas removed from the airlock enclosure 18.

For evacuating the cut off blocks 22 from the process enclosure 17, the device according to the invention comprises means for opening the partition door 19 when the pressure in the airlock enclosure 18 and preferably also the temperature is adjusted to the pressure and respectively the temperature in the process enclosure 17, means for transporting at least one cut off foam block 22 through said open partition door 19 into the airlock enclosure, which means comprise said second 23 and third conveyer belt 24 illustrated in the figures, means for closing said partition door 19 after said block has been transported into the airlock enclosure 18, means, for example an air or gas inlet opening provided with a shut-off valve 49, for adjusting the pressure in said airlock enclosure to the prevailing ambient pressure, means for opening then said outlet door 20, means 24 and 50 for removing said cut off foam block 22 through the open outlet door from the airlock enclosure 18 and means for closing said outlet door 20.

After the outlet door 20 has been closed, the pressure and preferably also the temperature in the airlock enclosure 18 are adjusted by means of blower unit 39, heat exchanger 45 and possibly pump unit 46 and/or adjustable valve 52. The device according to the invention can further be completed with means for controlling the humidity of the gases supplied to the process and airlock enclosure. Moreover, a gas circulation can be created in the process enclosure 17 by means of a fan 51 to obtain a more uniform pressure and temperature in that enclosure 17.

The following examples were performed with the device illustrated in the figures and described hereinabove.

EXAMPLE 1

In this example, polyurethane foam blocks were produced at a below ambient pressure of about 0.7 bar and at a temperature of about 25° C. This situation corresponds to the situation represented in FIG. 1.

Before starting to discharge reaction mixture into trough 4, air was exhausted from the enclosure 2 by means of blower units 25 and 39, with the outlet door 20 closed and the partition door 19 open, so as to reduce the pressure within the enclosure to about 0.7 bar. In the meantime, air was supplied into the process enclosure and the airlock enclosure 18 through pipings 33 and 44, respectively. The supplied air was heated up to a temperature of 25° C. After 10 minutes a stable condition of 25° C./0.7 bar was obtained inside the complete enclosure by adjusting the speed of blower units 25 and 39 and by adjusting valves 35 and 32.

Then, a chemical reaction mixture consisting of the following ingredients (in parts by weight) was metered to the mixing head and discharged onto the continuously driven bottom paper 10:

| Conventional polyether polyol | 100 |
|---|---|
| Water | 4.5 |
| TDI 80/20 | 57.1 |
| Silicone surfactant | 1.7 |
| Amine catalyst | 0.14 |
| Stannous octoate | 0.23 |

This reaction mixture was allowed to expand freely and to polymerize on the bottom paper which was continuously moving towards the cut off unit at a speed of about 3 meters per minute. When the foam block reached the desired length of 30 m, the cut off unit was actuated and the cut off foam block was accelerated into the airlock onto conveyer 24 leaving space for the continuous production of the next foam block of the desired length. The partition door 19 was closed, blower unit 39 was stopped and the temperature and the pressure in the airlock were regulated from the process conditions to ambient pressure by opening valve 49. After this, the outlet door 20 was opened and the foam block was accelerated away onto conveyor 50 and further distributed onto a cure rack system. Then outlet door 20 and valve 49 were closed again and the temperature and pressure in the airlock were again regulated to respectively 25° C. and 0.7 bar by removing gas by means of blower unit 39 and by simultaneously supplying air through piping 44 and heat exchanger 45. The partition door 19 was opened again and the process was repeated untill the required continuous production of foam blocks was completed. At steady state operation, the average supply of air through piping 33 into the process enclosure 17 was about 900 $Nm^3$ per hour while the blowing gas production showed a steady state value of about 700 $Nm^3$/hour. The average steady state temperature of the air supplied into the process enclosure was 22.5° C.

During the whole production run after the start up, following steady state values of temperature and pressure were measured inside the process enclosure:

Temperature: average: 25.3° C.
    minimum: 24.1° C.
    maximum: 26.0° C.
Pressure: average: 0.699 bar
    minimum: 0.694 bar
    maximum: 0.704 bar The foam blocks produced were 30 m long, 2.1 m wide and 1.22 m high. The net density was 16.1 $kg/m^3$ and the ILD hardness at 40% indentation was 86 N. Further more the foam showed good properties relative to the density, and comparable properties to a foam produced with CFC11 as physical blowing agent with equivalent density and hardness.

EXAMPLE 2

To illustrate the very broad range of polyurethane foams which can be produced by using pressure as a process parameter exactly the same chemical reaction mixture as used in example 1 was used again with following specified enclosure conditions: temperature: 25° C.; pressure: 1.0 bar absolute. The ambient conditions were: temperature: 21° C.; pressure: 1.017 bar. The same method and equipment as in example 1 was applied (see FIG. 1). During the whole steady state production run following values were measured inside the process enclosure:

Temperature: average: 24.9° C.
    minimum: 23.8° C.
    maximum: 25.7° C.
Pressure: average: 1.002 bar
    minimum: 0.993 bar
    maximum: 1.007 bar At steady state, the average amount of air supplied into the process enclosure 17 was 2500 $Nm^3$/hour during the production of the foam. In contrast to Example 1, use has been made of the auxiliary pump unit 36 to supply such an amount of air. This air was heated up to a temperature of 23.5° C. by means of heat exchanger 34. The produced blowing gases and the supplied air were pumped out of the process enclosure 17 by means of blower unit 25 at an average flow rate of about 3100 $Nm^3$/hour (=2500 $Nm^3$+a blowing gas production rate of about 600 $Nm^3$ per hour). The airlock enclosure 18 was operated as in Example 1, except that air was pumped in this enclosure by means of an auxiliary pump unit 46. The foam blocks produced had the same dimensions, but the net foam density was 21.3 $kg/m^3$ and the ILD hardness at 40% indentation was 119 N. Again the foam showed an excellent quality relative to the density.

During the same production run the addition of air was stopped for 30 minutes and the pressure was only controlled by controlling the speed of the blower units. During this period following unsatisfactory values were measured inside the process enclosure Temperature: rose to 68° C.
  Pressure: minimum: 0.925 bar
  maximum 1.056 bar The foam density of the blocks produced during this period varied between 19.4 and 22.9 kg/m³, which is unsatisfactory.

EXAMPLE 3

Again the same method and equipment from examples 1 and 2 was applied to produce a polyurethane foam under following conditions: temperature: 35° C.; pressure: 1.3 bar absolute. In this example, however, the configuration as shown in FIG. 2 for creating an above ambient pressure is used. The chemical reaction mixture consisted of following ingredients:

|  | parts by weight |
| --- | --- |
| Conventional polyether polyol | 100 |
| Water | 3.5 |
| TDI 80/20 | 47.4 |
| Silicone surfactant | 1.5 |
| Amine catalyst | 0.19 |
| Stannous octoate | 0.27 |

During the whole production run from start up till stop following values of temperature and pressure were measured inside the enclosure Temperature: average: 35.2° C.
  minimum: 33.9° C.
  maximum: 36.3° C.
Pressure: average: 1.298 bar
  minimum: 1.289 bar
  maximum: 1.310 bar At steady state operation the amount of air actively added into the process enclosure by blower unit 25 was 175 Nm³ per hour with a temperature of 32° C. The foam blocks produced were 30 m long, 2.05 m wide and 1.07 m high. The net foam density was 34.6 kg/m³ and the ILD hardness at 40% indentation was 253 N. Further more the foam showed good properties relative to the density and a high hardness, which can normally only be obtained at this density when special polyols would be used in the reaction mixture.

It will be clear that the invention is not limited to the hereinabove described embodiments but that many modifications can be considered for example with respect to the construction and dimensions of the continuous foam machine and the enclosure without leaving the scope of the present patent application.

In this way it may be possible to omit the airlock enclosure and to use instead appropriate rollers or flaps or conveyors which are pressed against the produced foam where this foam leaves the process enclosure, especially when a sufficiently rigid foam is produced. An advantage of this system is that the slabstock foam can be cut outside the process enclosure which allows to produce longer blocks without requiring however a larger enclosure.

In the method according to the invention, it is not necessary to provide a completely air-tight seal around the slabstock foam leaving the process enclosure since a certain amount of gas may either enter or leave this enclosure according to the pressure therein. Therefore, by a substantially hermetical enclosure is meant in the present patent application an enclosure which is air-tight except possibly for some small openings which allow for example only air to enter into the enclosures at a flow rate within the limits defined in the claims for reducing the pressure fluctuations when creating a below ambient pressure in the enclosure.

We claim:

1. A method for the continuous manufacture of slabstock polyurethane foam comprising applying a polymerizable reaction mixture of polyurethane reaction components containing a blowing agent substantially continuously onto a moving conveyor means, allowing a free rise expansion and polymerization of this reaction mixture on the conveyor means so as to form polyurethane foam, which expansion and polymerization produces blowing gas, the free rise expansion and polymerization of the reaction mixture being carried out in a substantially closed space under substantially steady state conditions, surrounding the reaction mixture at least partially with a layer of gas and during said free rise expansion and polymerization of the reaction mixture maintaining the pressure of the gas substantially constant within a predetermined pressure range by continuously exhausting gas from said space while simultaneously and continuously supplying gas to said space in addition to the blowing gas produced whereby fluctuations of the pressure within said pressure range are reduced.

2. The method of claim 1, wherein the temperature of the gas layer in said closed space is maintained, at least during said free rise expansion and polymerization, within a range of 5% above or below a predetermined temperature value at least partially by controlling at least one of the temperature and the rate of flow of the gas supplied to said space.

3. The method of claim 2, wherein said predetermined temperature value is between 10° and 75° C.

4. The method of claim 2, wherein the temperature value is between 20° and 50° C.

5. The method of any one of claims 1 to 4, wherein the pressure within said space is maintained at or below the prevailing ambient pressure and said gas is supplied at a flow rate which is at least equal to half the rate of the blowing gas produced.

6. The method of claim 5, wherein the gas is supplied at a flow rate at least equal to the rate of the blowing gas produced, but which flow rate is smaller than five times the rate of the blowing gas produced.

7. The method of claim 5, wherein the gas is supplied at a flow rate at least equal to the rate of the blowing gas produced, but which flow rate is smaller than three times the rate of the blowing gas produced.

8. The method of any one of claims 1 to 4, wherein the pressure within said space is maintained above the prevailing ambient pressure and said gas is supplied at a flow rate which is at least equal to one tenth of the rate of the blowing gas produced.

9. The method of claim 8, wherein the gas is supplied at a flow rate at least equal-to one third of the rate of the blowing gas produced, but which flow rate is smaller than four times the rate of the blowing gas produced.

10. The method of claim 8, wherein the gas is supplied at a flow rate at least equal to one third of the rate of the blowing gas produced, but which flow rate is smaller than two times the rate of the blowing gas produced.

11. The method of claim 1, wherein said gas is supplied at a substantially constant flow rate during said free rise expansion and polymerization of the reaction mixture.

12. The method of claim 1, wherein said pressure is maintained within a range of 1% above or below a predetermined pressure value during said free rise expansion and polymerization of the reaction mixture.

13. The method of claim 1, wherein gas is positively exhausted from said space.

14. The method of claim 13, wherein the gas is supplied to said space at the prevailing ambient pressure.

15. The method of claim 1, wherein the gas is supplied to said space under pressure.

16. The method of claim 1, wherein said predetermined pressure range is from 0.5 to 10 bars.

17. The method of claim 16, wherein the pressure range is from 0.7 to 1.5 bars.

18. The method of claim 1, including purifying said exhausted gas.

19. A device for the continuous manufacture of slabstock polyurethane foam comprising a substantially closed enclosure, a conveyor means located inside said enclosure, a mixing head for mixing polyurethane reaction components containing a blowing agent to form a reaction mixture, means for discharging said reaction mixture onto said conveyor means while the conveyor means is continuously moving so as to enable a free rise expansion and polymerization of said reaction mixture on said conveyor means in said enclosure, gas pumping means having a gas inlet and a gas outlet, means for connecting said gas inlet to said enclosure so as to be able to positively exhaust gas from said enclosure by means of said gas pumping means during said free rise expansion and polymerization of the reaction mixture, and gas supply means for continuously supplying gas into said enclosure during said free rise expansion and polymerization while simultaneously exhausting gas from said enclosure by means of said gas pumping means to reduce pressure fluctuations within said enclosure, wherein said device includes at least one partition door for dividing the enclosure into at least two compartments, a first compartment of which contains at least said conveyor means and means for cutting off foam blocks of a predetermined length, the second compartment having an outlet door, said gas pumping means being connected to said first compartment, and said gas supply means for supplying gas to said enclosure being connected to the first compartment, said device further includes means for adjusting the pressure in said second compartment to the pressure within said first compartment when said outlet door and said partition door are closed, means for opening said partition door when said pressure within the second compartment is adjusted to the pressure within said first compartment means for transporting at least one cut off foam block through said open partition door into the second compartment, means for closing said partition door after said block has been transported into said second compartment, means for adjusting the pressure in said second compartment to the prevailing ambient pressure, means for opening said outlet door when the pressure within said second compartment is adjusted to the prevailing ambient pressure, means for removing said cut off foam block through the open outlet door from the second compartment and means for closing said outlet door after said foam block has been removed from said second compartment.

20. The device of claim 19, including means for alternatively connecting said gas outlet of said gas pumping means to said enclosure during said free rise expansion and polymerization for pumping gas into said enclosure by means of said gas pumping means, and gas removing means for removing gas from said enclosure during said free rise expansion and polymerization while said gas is simultaneously being pumped into said enclosure by said gas pumping means.

21. The device of claim 20, wherein the gas supply means and the gas removing means is a reversible pump.

22. The device of any one of claims 19, 20 or 21, wherein said gas pumping means includes at least one blower.

23. The device of claim 19, wherein said gas supply means includes an adjustable valve for metering the supply of gas.

24. The device of claim 19, wherein the means for supplying gas into said enclosure includes at least one pump.

25. The device of claim 20, wherein the means for removing gas from said enclosure includes an adjustable valve.

26. The device of claim 20, wherein the means for removing gas from said enclosure includes at least one pump.

27. The device of claim 19, including means for controlling the temperature of the gas supplied to said enclosure.

* * * * *

UNITED STATES PATENT AND TRADEMARK OFFICE
CERTIFICATE OF CORRECTION

PATENT NO.: 5,804,113

DATED: September 8, 1998

INVENTORS: BLACKWELL et al.

It is certified that an error appears in the above-identified patent and that said Letters Patent is hereby corrected as shown below:

On the title page:

In the Related U.S. Application Data ([63]), after "abandoned" insert --, which is a 371 of PCT/EP91/02176 filed November 14, 1991--.

Signed and Sealed this

Twenty-eighth Day of December, 1999

Attest:

Q. TODD DICKINSON

*Attesting Officer*   *Acting Commissioner of Patents and Trademarks*